(12) United States Patent
Rohde et al.

(10) Patent No.: US 11,092,054 B1
(45) Date of Patent: Aug. 17, 2021

(54) FLASH-BOILING DOSER WITH THERMAL TRANSFER HELIX

(71) Applicant: Faurecia Emissions Control Technologies, USA, LLC, Columbus, IN (US)

(72) Inventors: John Rohde, Columbus, IN (US); Anthony Burnet, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 0 days.

(21) Appl. No.: 16/861,922

(22) Filed: Apr. 29, 2020

(51) Int. Cl.
*F01N 3/20* (2006.01)
*B01F 3/04* (2006.01)
*B01F 5/04* (2006.01)
*F02M 53/06* (2006.01)

(52) U.S. Cl.
CPC .......... *F01N 3/208* (2013.01); *B01F 3/04014* (2013.01); *B01F 5/045* (2013.01); *F01N 3/2066* (2013.01); *F02M 53/06* (2013.01); *F01N 2610/02* (2013.01); *F01N 2610/14* (2013.01); *F01N 2610/1453* (2013.01)

(58) Field of Classification Search
CPC .. B01F 3/04014; B01F 3/04021; B01F 5/045; F01N 3/2066; F01N 3/208; F01N 2610/02; F01N 2610/14; F01N 2610/1453; F02M 53/06
See application file for complete search history.

(56) References Cited

U.S. PATENT DOCUMENTS

| 4,486,270 | A | 12/1984 | Kaasenbrood |
| 5,240,688 | A | 8/1993 | Von Harpe |
| 5,590,521 | A | 1/1997 | Schnaibel |
| 5,827,490 | A | 10/1998 | Jones |
| 6,077,491 | A | 6/2000 | Cooper |
| 7,449,162 | B2 | 11/2008 | Schaller |
| 7,595,034 | B2 | 9/2009 | Nissinen |

(Continued)

FOREIGN PATENT DOCUMENTS

| CH | 707551 | 8/2014 |
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Audrey K Bradley
(74) *Attorney, Agent, or Firm* — Barnes & Thornburg LLP (57) ABSTRACT

An exhaust aftertreatment system for use with an over-the-road vehicle is disclosed. The exhaust aftertreatment system includes a flash-boil doser mounted to an exhaust conduit and a catalyst coupled to the exhaust conduit. The flash-boil doser configured to inject heated and pressurized reducing agent into an exhaust passageway defined by the exhaust conduit for distribution throughout exhaust gases passed through the exhaust conduit. The catalyst configured to react the reducing agent with the nitrous oxide in the flow of exhaust gases to provide treated exhaust gases with a reduced nitrous oxide amount.

15 Claims, 5 Drawing Sheets

(56) References Cited

U.S. PATENT DOCUMENTS

| | | |
|---|---|---|
| 7,984,609 B2 | 7/2011 | Doering |
| 8,100,191 B2 | 1/2012 | Beheshti |
| 8,413,427 B2 | 4/2013 | Mullins |
| 8,418,443 B2 | 4/2013 | Millet |
| 8,518,354 B2 | 8/2013 | Ayyappan |
| 8,763,372 B2 | 7/2014 | Pohl |
| 8,800,276 B2 | 8/2014 | Levin |
| 8,893,484 B2 | 11/2014 | Park |
| 8,967,484 B2 | 3/2015 | Nishizawa |
| 8,980,181 B2 | 3/2015 | Qi |
| 9,072,850 B2 | 7/2015 | McIntosh |
| 9,341,100 B2 | 5/2016 | Petry |
| 9,512,760 B2 | 12/2016 | Clayton, Jr. |
| 9,598,977 B2 | 3/2017 | Meyer |
| 9,683,447 B2 | 6/2017 | Gentile |
| 9,687,782 B1 | 6/2017 | Miao |
| 9,732,650 B2 | 8/2017 | Tomita |
| 9,771,850 B2 | 9/2017 | Henry |
| 10,337,380 B2 | 7/2019 | Willats |
| 2003/0079467 A1 | 5/2003 | Liu |
| 2005/0045179 A1 | 3/2005 | Faison |
| 2006/0218902 A1 | 10/2006 | Arellano |
| 2009/0031713 A1 | 2/2009 | Suzuki |
| 2009/0223211 A1 | 9/2009 | Bruck et al. |
| 2009/0294552 A1 | 12/2009 | Trapasso et al. |
| 2010/0314470 A1* | 12/2010 | Cavanagh ............. F01N 3/2066 239/490 |
| 2012/0322012 A1 | 12/2012 | Tsumagari |
| 2013/0232956 A1 | 9/2013 | Loman et al. |
| 2013/0239549 A1 | 9/2013 | Henry |
| 2013/0259755 A1 | 10/2013 | Kim |
| 2014/0314644 A1 | 10/2014 | Bugos |
| 2014/0363358 A1 | 12/2014 | Udd |
| 2015/0128575 A1* | 5/2015 | Schmitt ................ F01N 3/0205 60/286 |
| 2015/0135683 A1 | 5/2015 | Petry |
| 2015/0315950 A1 | 11/2015 | Hagimoto |
| 2016/0017780 A1 | 1/2016 | Kinugawa |
| 2016/0053652 A1 | 2/2016 | Van Vuuren |
| 2016/0061083 A1 | 3/2016 | Pramas |
| 2017/0122169 A1 | 5/2017 | Ettireddy |
| 2017/0198621 A1 | 7/2017 | Gaiser |
| 2017/0204762 A1 | 7/2017 | Kotrba |
| 2018/0080360 A1 | 3/2018 | Kurpejovic |
| 2018/0142593 A1 | 5/2018 | Wang |
| 2019/0383187 A1 | 12/2019 | Sarsen |
| 2020/0131966 A1 | 4/2020 | Jeannerot |
| 2020/0332693 A1* | 10/2020 | Matsumoto ........ B01D 53/9409 |

FOREIGN PATENT DOCUMENTS

| | | |
|---|---|---|
| DE | 102009005012 | 7/2010 |
| DE | 102017101310 | 8/2017 |
| DE | 102018209405 | 12/2019 |
| EP | 2140117 | 1/2010 |
| EP | 2167860 | 3/2010 |
| EP | 2302276 | 3/2011 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| GB | 2568269 | 5/2019 |
| JP | 2015078643 | 4/2015 |
| JP | 2020139426 | 9/2020 |
| KR | 20170013687 | 2/2017 |
| WO | 199956858 | 11/1999 |
| WO | 2005025725 | 3/2005 |
| WO | 2006087553 | 8/2006 |
| WO | 2007124791 | 11/2007 |
| WO | 2008077587 | 7/2008 |
| WO | 2008108955 | 9/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages

Extended European Search Report for European Appl. No. 19207953.1, dated Mar. 13, 2020, 7 pages.

Office Action dated Apr. 3, 2020, for U.S. Appl. No. 16/184,567 (pp. 1-15).

* cited by examiner

FLASH-BOILING DOSER WITH THERMAL TRANSFER HELIX

BACKGROUND

The present disclosure relates to exhaust aftertreatment systems for automotive applications, and particularly to the incorporation of flash-boil dosers into such systems.

SUMMARY

An over-the-road vehicle in accordance with the present disclosure including an internal combustion engine that produces exhaust gases and an exhaust aftertreatment system configured to treat the exhaust gases before releasing them into the atmosphere. The exhaust aftertreatment system can include a number of components such as, for example, a diesel oxidation catalyst (DOC), a diesel particulate filter (DPF), a selective catalytic reduction unit (SCR), and reducing agent mixer.

The reducing agent mixer includes a mixing can defining at least a portion of an exhaust passageway for receiving a flow of exhaust gases therein and a flash-boil doser. The flash-boil doser is mounted to the mixing can and configured to heat the reducing agent to drive the reducing agent to a predetermined pressure and to inject the reducing agent into the exhaust passageway of the mixing can.

The flash-boil doser includes a doser body in which reducing agent is conditioned before injection into an exhaust stream, a doser inlet coupled to the doser body, and a doser outlet coupled to the doser body. The doser body includes a housing and a heat exchanger assembly arranged in the housing. The heat exchanger assembly is configured to heat reducing agent thereby increasing a pressure within the heat exchanger assembly to drive injection of the reducing agent into the exhaust passageway. The doser inlet defines an inlet passageway that opens into the heat exchanger assembly to admit reducing agent from an associated reducing agent tank. The doser outlet defines an outlet passageway that opens from the heat exchanger assembly into the exhaust passageway of the mixing can.

The doser outlet is spaced apart axially from the doser inlet along a doser axis of the flash-boil doser such that the inlet passageway and outlet passageway are axially aligned. The doser body is arranged axially between the doser inlet and the doser outlet.

The heat exchanger assembly includes an outer sleeve, an inner helical insert, and at least one heater arranged around an outer surface of the outer sleeve. The outer sleeve is shaped to define a spiral channel that wraps around the doser axis and opens toward the doser axis. The inner helical insert is arranged in the outer sleeve and shaped to mate with the spiral channel to form a helical passageway between the outer sleeve and the inner helical insert. The helical passageway is in fluid communication with the inlet and outlet passageways. The heater arranged is configured to conductively heat the outer sleeve to heat reducing agent in the helical passageway.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

For the purposes of promoting an understanding of the principles of the disclosure, reference will now be made to a number of illustrative embodiments illustrated in the drawings and specific language will be used to describe the same.

Figure 1:
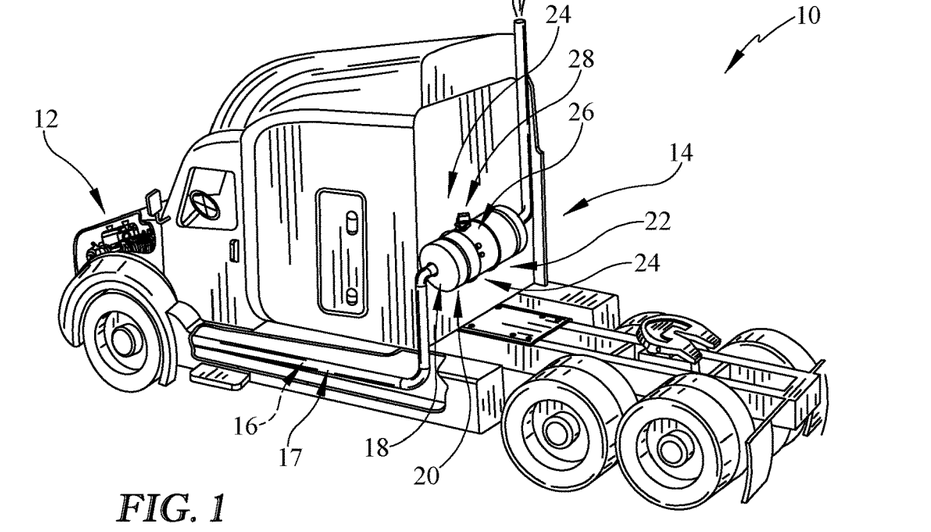
FIG. 1 is perspective view of an over-the-road automotive vehicle including an internal combustion engine and an exhaust aftertreatment system with a flash-boil doser configured to deliver a reducing agent into engine exhaust gases flowing through an exhaust conduit.

An illustrative over-the-road vehicle 10 includes an engine 12 and an exhaust aftertreatment system 14 in accordance with the present disclosure is shown, for example, in FIG. 1. The engine 12 is, illustratively, an internal combustion engine 12 configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, and a reducing agent mixer 24. The exhaust gases pass through or by each of the aftertreatment devices to remove or reduce different effluents. The reducing agent mixer 24 is mounted upstream of the SCR 22 and is configured to inject and mix a reducing agent, illustratively a urea solution, into the exhaust gases. Chemical reaction of the reducing agent with the exhaust gases occurs in downstream of the reducing agent mixer 24 in the SCR 22 to reduce $NO_x$ to produce treated exhaust gases before being released in the atmosphere.

Figure 2:
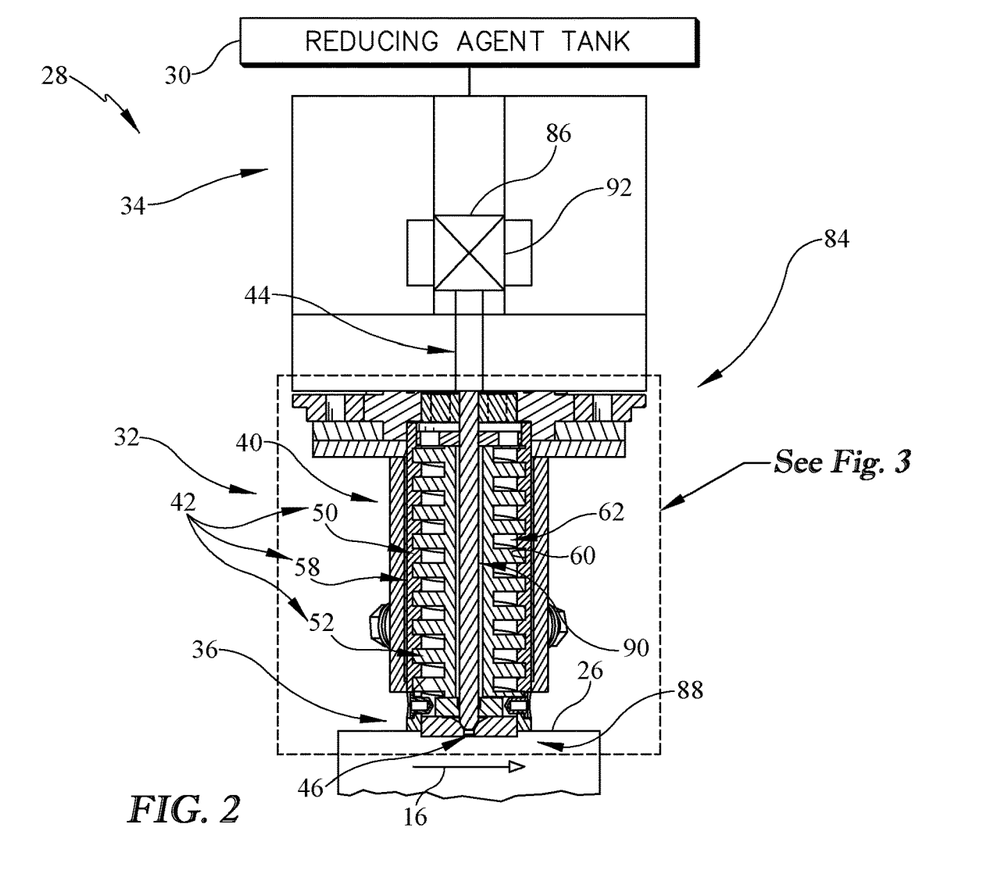
FIG. 2 is a diagrammatic view of the flash-boil doser included in the over-the-road vehicle of FIG. 1 showing that the flash-boil doser includes a doser body, a doser inlet coupled to the doser body defining an inlet passageway that admits reducing agent from an associated reducing agent tank into the doser body, and a doser outlet coupled to the doser body defining an outlet passageway that opens from the doser body into the exhaust passageway.

The reducing agent mixer 24 includes a mixing can 26 and a flash-boil doser 28 as shown in FIGS. 1 and 2. The mixing can 26 is coupled fluidly with the exhaust passageway 16 to receive the exhaust gases flowing therethrough. The reducing agent is stored on the vehicle 10 in a reducing agent tank 30 and is conducted to the flash-boil doser 28 for heating prior to being discharged by the flash-boil doser 28 into the mixing can 26.

Figure 3:
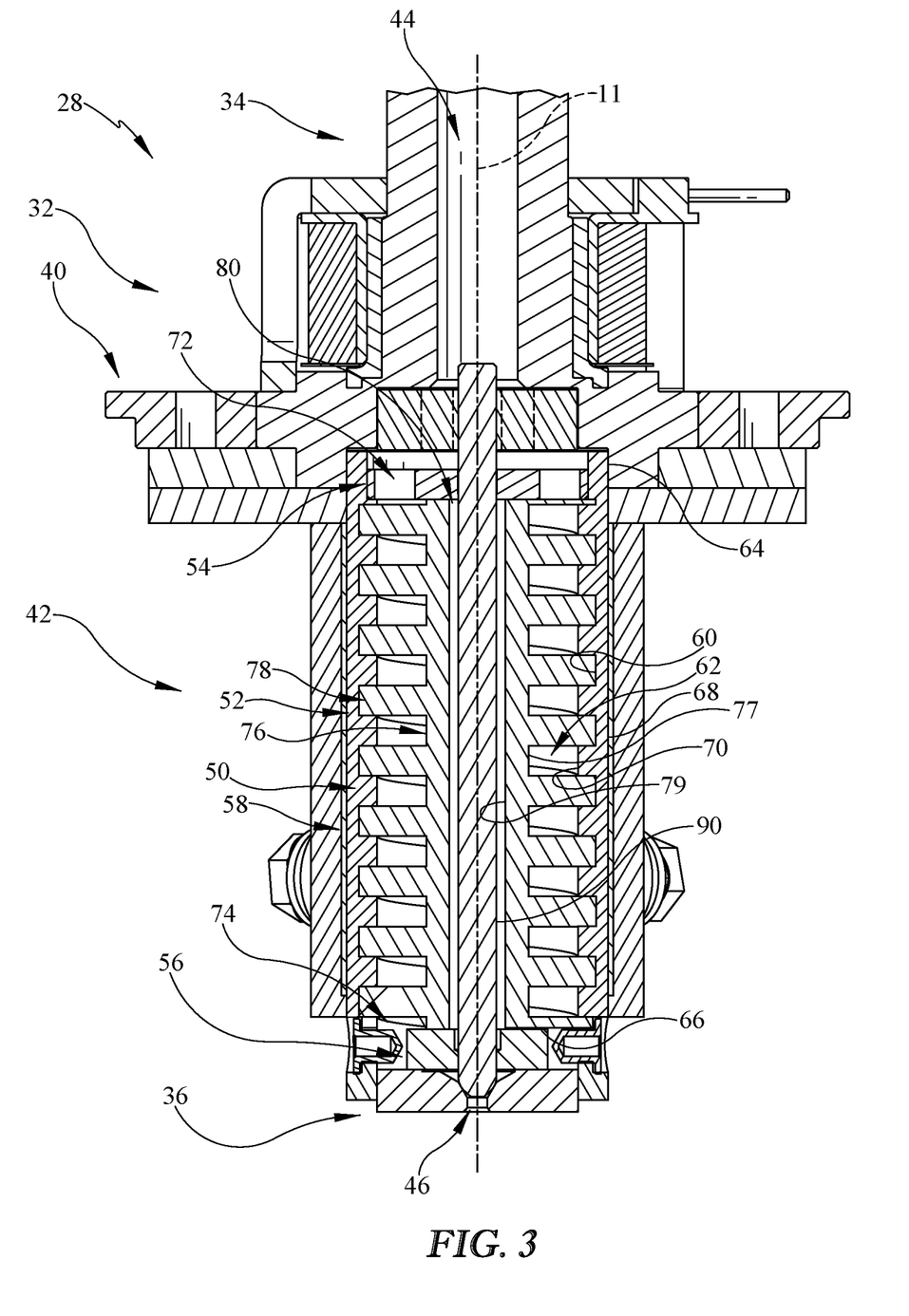
FIG. 3 is a detail diagrammatic view of the flash-boil doser of FIG. 2 showing the doser body includes a housing and a heat exchanger assembly arranged in the housing, the heat exchanger assembly including an outer sleeve defining a spiral channel that wraps around a doser axis and opens toward the doser axis, an inner helical insert arranged in the outer sleeve to mate with the spiral channel and form a helical passageway between the outer sleeve and the inner helical insert, and at least one heater arranged around an outer surface of the outer sleeve to conductively heat the outer sleeve to heat reducing agent in the helical passageway.
Figure 5:
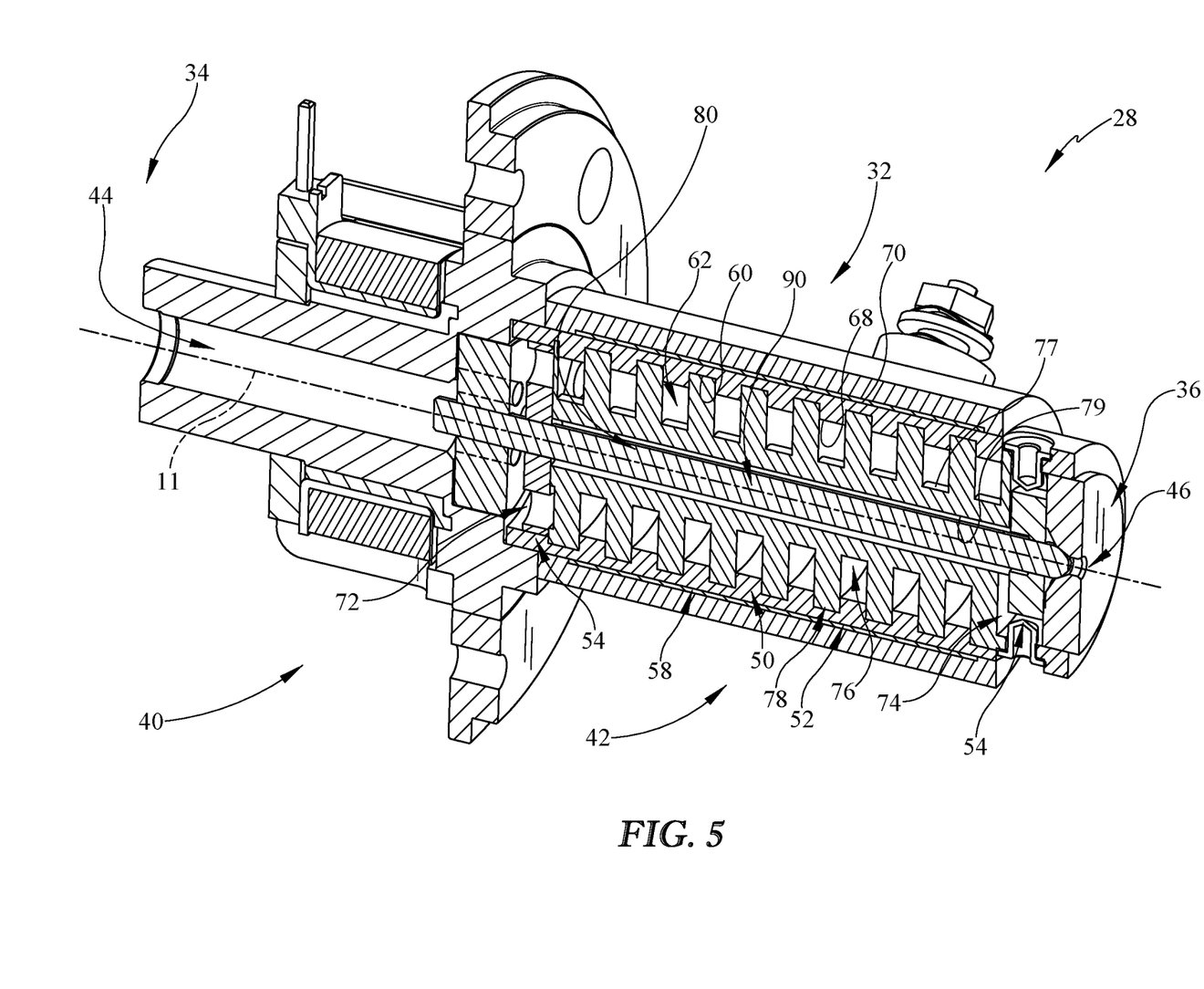
FIG. 5 is a cross-sectional view of the flash-boil doser of FIG. 3 showing the inner helical insert includes a center tube that extends axially along the axis between ends of the inner helical insert and threads integrally formed with the tube that extend radially from the tube and wrap around the doser axis, and further showing the threads are sized to fit into the spiral channel of the outer sleeve.

The flash-boil doser 28 includes a doser body 32, a doser inlet 34, and a doser outlet 36 as shown in FIGS. 2, 3, and 5. The doser body 32 includes a housing 40 and a heat exchanger assembly 42 that is arranged in the housing 40. The heat exchanger assembly 42 is configured to heat reducing agent and thereby increase a pressure within the heat exchanger assembly 42 to drive injection of the reducing agent into the exhaust passageway 16. The doser inlet 34 is coupled to the doser body 32 and defines an inlet passageway 44 that opens into the heat exchanger assembly 42 to admit reducing agent from the reducing agent tank 30. The doser outlet 36 is coupled to the doser body 32 and defines an outlet passageway 46 that opens from the heat exchanger assembly 42 into the exhaust passageway 16 of the exhaust aftertreatment system 14.

In the illustrative embodiment, the doser outlet 36 is spaced axially from the doser inlet 34 relative to a doser axis 11 of the flash-boil doser 28 as shown in FIGS. 2, 3, and 5. The doser inlet and outlet 34, 36 are spaced apart axially along the doser axis 11 such that the inlet passageway 44 and outlet passageway 46 are axially aligned. The doser body 32 is arranged axially between the doser inlet 34 and doser outlet 36.

The heat exchanger assembly 42 includes an outer sleeve 50, an inner helical insert 52, guide plates 54, 56, and at least one heater 58 as shown in FIGS. 2-5. The outer sleeve 50 is shaped to define a spiral channel 60 that wraps around the doser axis 11 and opens toward the doser axis 11. The inner helical insert 52 is arranged in the outer sleeve 50 and shaped to mate with the spiral channel 60 to form a helical passageway 62 between the outer sleeve 50 and the inner helical insert 52. The guide plates 54, 56 are each coupled to a respective end of the outer sleeve 50 to define the heat exchanger inlet 72 and the heat exchanger outlet 74 in fluid communication with the helical passageway 62. The heater 58 is arranged around an outer surface 68 of the outer sleeve 50 and configured to conductively heat the outer sleeve 50 to heat reducing agent in the helical passageway 62.

The helical passageway 62 is in fluid communication with both the inlet passageway 44 and the outlet passageway 46 to admit reducing agent in to the helical passageway 62 and to inject reducing agent into exhaust passageway 16 as shown in FIGS. 2-5. As the helical passageway 62 wraps around the doser axis 11, the reducing agent flowing through the helical passageway 62 has increased contact with the outer sleeve 50. In this way, the convective heat transfer between the outer sleeve 50 and the reducing agent in the helical passageway 62 may be increased.

In other embodiments, a flash-boil doser may include an outer sleeve and a helical insert that is arranged in the outer sleeve to form a helical passageway. To efficiently transfer heat generated by the heater through the outer sleeve to the helix and ultimately to the reducing agent in the helical passageway, the helix insert requires an interference fit to the body. To achieve the interference fit, the outer sleeve may be heated during assembly so that the interference between the helix insert and the outer sleeve is accomplished when the outer sleeve cools. Such an interference fit may be difficult and costly for manufacturing because the helix insert cannot be excessively pressed.

In the illustrative embodiments, the outer sleeve 50 is tapped to form the spiral channel 60 similar to a nut for a bolt. The inner helical insert 52 forms the threads 78 that mate with the spiral channel 60 to form the helical passageway 62, which eliminates the need for the interference fit between the outer sleeve 50 and the inner helical insert 52 during assembly.

The arrangement of the inner helical insert 52 with the outer sleeve 50 may also eliminate the need for tolerances to maintain interference by contraction. The spiral channel 60 may be can be easily manufactured and the helical passageway 62 formed between the outer sleeve 50 and the inner helical insert 52 may improve thermal losses of the heat exchanger assembly 42 as well.

Figure 4:
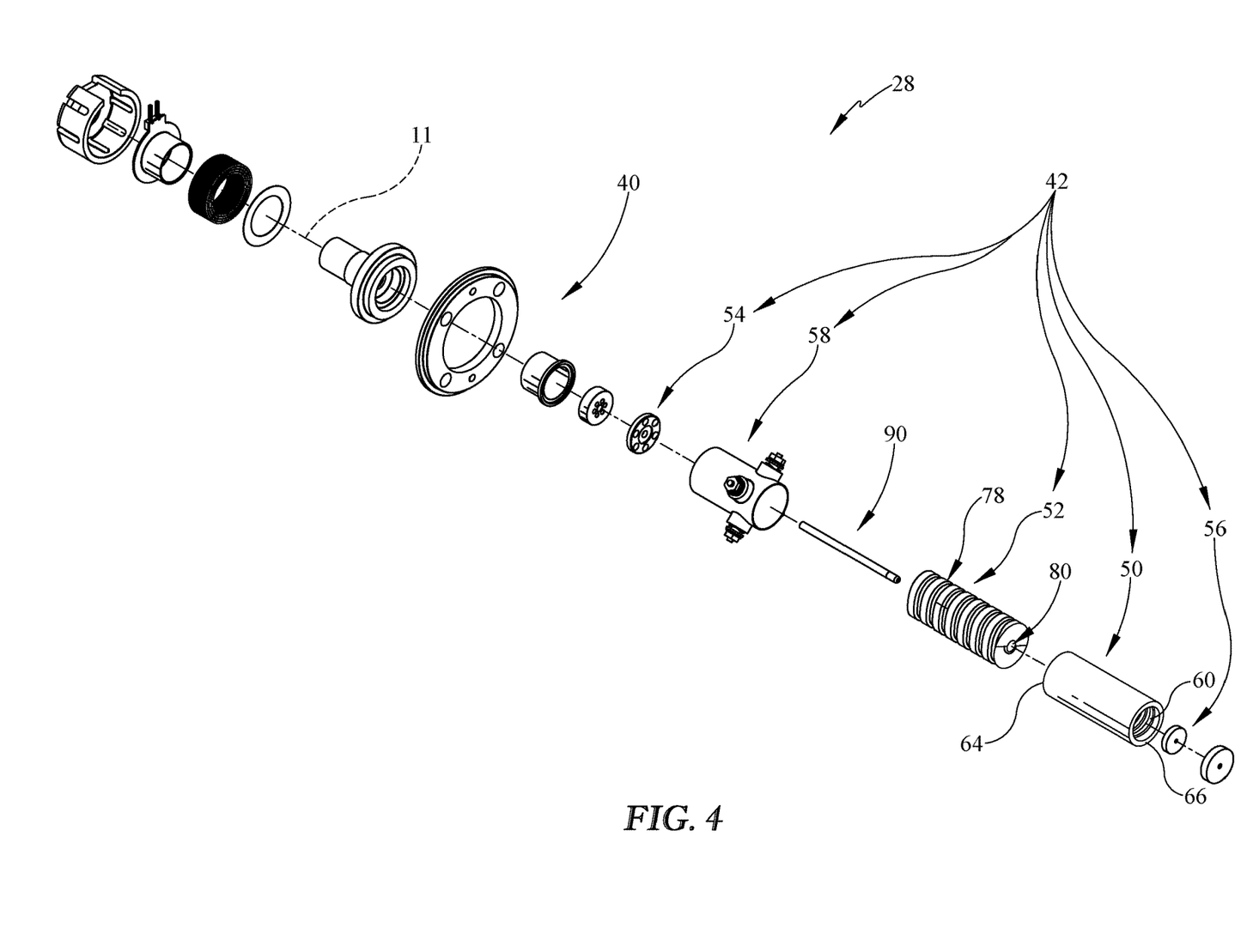
FIG. 4 is an exploded view of the flash-boil doser of FIG. 3 showing heat exchanger further includes inlet and outlet guide plates coupled to the respective ends of the outer sleeve to from an inlet and outlet of the helical passageway.

The guide plates 54, 56 include a first guide plate 54 and a second guide plate 56 that are coupled to the respective ends 64, 66 of the outer sleeve 50 as shown in FIGS. 3-5. The first, or inlet guide plate 54 is coupled to a first end 64 of outer sleeve 50 to form at least one heat exchanger inlet 72 that opens into the helical passageway 62. The second, or outlet guide plate 56 is coupled to a second end 66 of the outer sleeve 50 to form a heat exchanger outlet 74. The guide plates 54, 56 are coupled to the respective ends 64, 66 to block reducing agent from flowing into an inner passageway 80 of the inner helical insert 52.

The inner helical insert 52 is shaped to include a center tube 76 and threads 78 as shown in FIGS. 3-5. The center tube 76 extends axially along the axis between ends of the inner helical insert 52. The threads 78 extend radially from the tube 76 and wrap around the doser axis 11. The tube 76 and threads 78 are integrally formed such that the tube 76 and the threads 78 are a single integral component.

The threads 78 of the inner helical insert 52 are sized to fit into the spiral channel 60 of the outer sleeve 50 as shown in FIGS. 3 and 5. Similar to a bolt with threads that mate with the corresponding nut, the threads 78 mate with the spiral channel 60 of the outer sleeve 50 to couple the outer sleeve 50 and the inner helical insert 52 together. However, a portion of the threads 78 extend into the spiral channel 60 so that the center tube 76 is spaced apart from the outer sleeve 50 to form the helical passageway 62 between the outer sleeve 50 and the inner helical insert 52.

In the illustrative embodiment, to assure the threads 78 of the inner helical insert 52 make full contact with the spiral channel 60 of the outer sleeve 50, the inner helical insert 52 is threaded into the outer sleeve 50 with National Pipe Thread (NPT) type of thread interference. The outer sleeve 50 is tapped to form the spiral channel 60 that mates with the threads 78.

In the illustrative embodiment, the center tube 76 is shaped to include an outer surface 77 and an inner surface 79 as shown in FIGS. 2-5. The outer surface 77 forms a portion of the helical passageway 62. The inner surface 79 defines the inner passageway 80 that extends axially through center tube 76 of the inner helical insert 52. In the illustrative embodiment, the inner passageway 80 of the inner helical insert 52 is sized to receive a portion of a pressure-activated outlet valve 84 included in the doser outlet 36 as shown in FIGS. 2-5.

In the illustrative embodiment, the helical passageway 62 is defined between the outer surface 77 of the inner helical insert 52, an inner surface 70 of the outer sleeve 50, and the adjacent threads 78 as shown in FIGS. 2-5. The threads 78 extend radially outward from the outer surface 77 of the tube 76 so that only a portion of the thread 78 extends into the spiral channel 60.

Turning again to the doser outlet 36, the doser outlet 36 includes a pressure-activated outlet valve 84 that blocks or allows flow through the outlet passageway 46 as shown in FIG. 2 The pressure-activated outlet valve 84 is configured to move from a normally-closed position to an open position when the predetermined pressure within the helical passageway 62 is reached. The pressure-activated outlet valve 84 moves from the normally-closed position to the open position to discharge the heated reducing agent from the helical passageway 62 through the outlet passageway 46 and into the exhaust passageway 16 for mixing with the exhaust gases therein.

The pressure-activated outlet valve 84 includes an inlet valve 86, an outlet valve 88, and a connector rod 90 as shown in FIG. 2. The inlet valve 86 blocks or allows flow through the inlet passageway 44, while the outlet valve 88 blocks or allows flow through the outlet passageway 46. The connector rod 90 mechanically interconnects the inlet valve 86 and the outlet valve 88 as shown in FIG. 2.

The connector rod 90 is configured to cause the inlet valve 86 to move to a closed position in response to motion of the pressure-activated outlet valve 84 to the opened position. The connector rod 90 is also configured to cause the inlet valve 86 to move to an opened position in response to motion of the pressure-activated outlet valve 84 to the closed position. Reducing agent is admitted into the helical passageway 62 when the inlet valve 86 is in the opened position. Reducing agent is discharged from the helical passageway 62 when the outlet valve 88 is in the opened position in response to the pressure within the helical passageway 62 reaching the predetermined pressure. In the illustrative embodiments, the connector rod 90 extends through the inner passageway 80 as shown in FIGS. 2-5.

The heater 58 is configured to conductively heat the outer sleeve 50 and the inner helical insert 52, which in turn convectively heat the reducing agent that is admitted into the helical passageway 62. Meanwhile, the pressure-activated outlet valve 84 is in the normally-closed position due to the pressure of the reducing agent in the helical passageway 62 being less than the predetermined pressure. The pressure of the reducing agent in the helical passageway 62 may be increased by heating the reducing agent with the heater 58.

As a result of this, the reducing agent expands due to thermal expansion raising the pressure inside the helical passageway 62. Due to the pressure of the reducing agent within the helical passageway 62, the reducing agent may be heated to a temperature that is higher than its normal boiling point. Additionally, the reducing agent may be pre-heated with additional heaters and/or pumps prior to entering the helical passageway 62. The pressure-activated outlet valve 84 changes to the open position once the predetermined pressure is reached within the helical passageway 62.

In the illustrative embodiment, the heater 58 is an electric resistive heating element that generates heat by passing an electrical current through a conductive material, i.e. a resistor. Electrical current is provided to the heater 58, which causes the resistor to generate heat to heat the reducing agent in the helical passageway 62.

In some embodiments, the heater 58 is a ceramic heating element. Similar to resistive heating elements that use metallic materials such as wire, the ceramic heating element generates heat by passing an electrical current through a ceramic material or ceramic plates. Electrical current is provided to the heater 58, which causes the resistor to generate heat to heat the reducing agent in the helical passageway 62. In other embodiments, the heater 58 is another type of electrical resistive heating element that actively generates heat when provided electrical power or current.

In the illustrative embodiments, The flash-boil doser 28 further includes a cooling system having coolers 92 configured to selectively cool the temperature of select components included in the flash-boil doser 28 as shown in FIGS. 2-5. The cooling system includes at least one cooler 92 coupled to the doser inlet 34 and aligned axially with the inlet valve 86. In some embodiments, another cooler 92 may be coupled to an outer surface of the doser outlet 36 and aligned axially with the outlet valve 88. The coolers 92 are illustratively embodied as ducts that hold and circulate a coolant fluid therethrough to cause heat transfer between the flash-boil doser 28 and the coolant fluid. The ducts of each cooler 92 may be sized according to an amount of thermal heat transfer desired at each location.

In illustrative embodiments, the heater 58 conductively heats the outer sleeve 50 and the inner helical insert 52 to then convectively heat the reducing agent in the helical passageway 62. The reducing agent or DEF may be heated to about 160 degrees Celsius. At this temperature, the DEF is at the saturated vapor pressure. At this temperature range DEF cavitation could occur. Another potential problem may be the temperature limits of the mechatronics of the flash-boil doser 28 (i.e. housing 40).

To help mitigate these issues, a cooling system is included. The cooling system includes coolers 92 with plumbing (metal tubing made of stainless steel, aluminum, or suitable DEF resistant material) in strategic areas to selectively cool these areas below the cavitation threshold and the mechatronic components. In the illustrative embodiment, the heater 58 may also act as a cooler 92 and be configured to selectively cool the temperature of the doser body 32.

Figure 6:
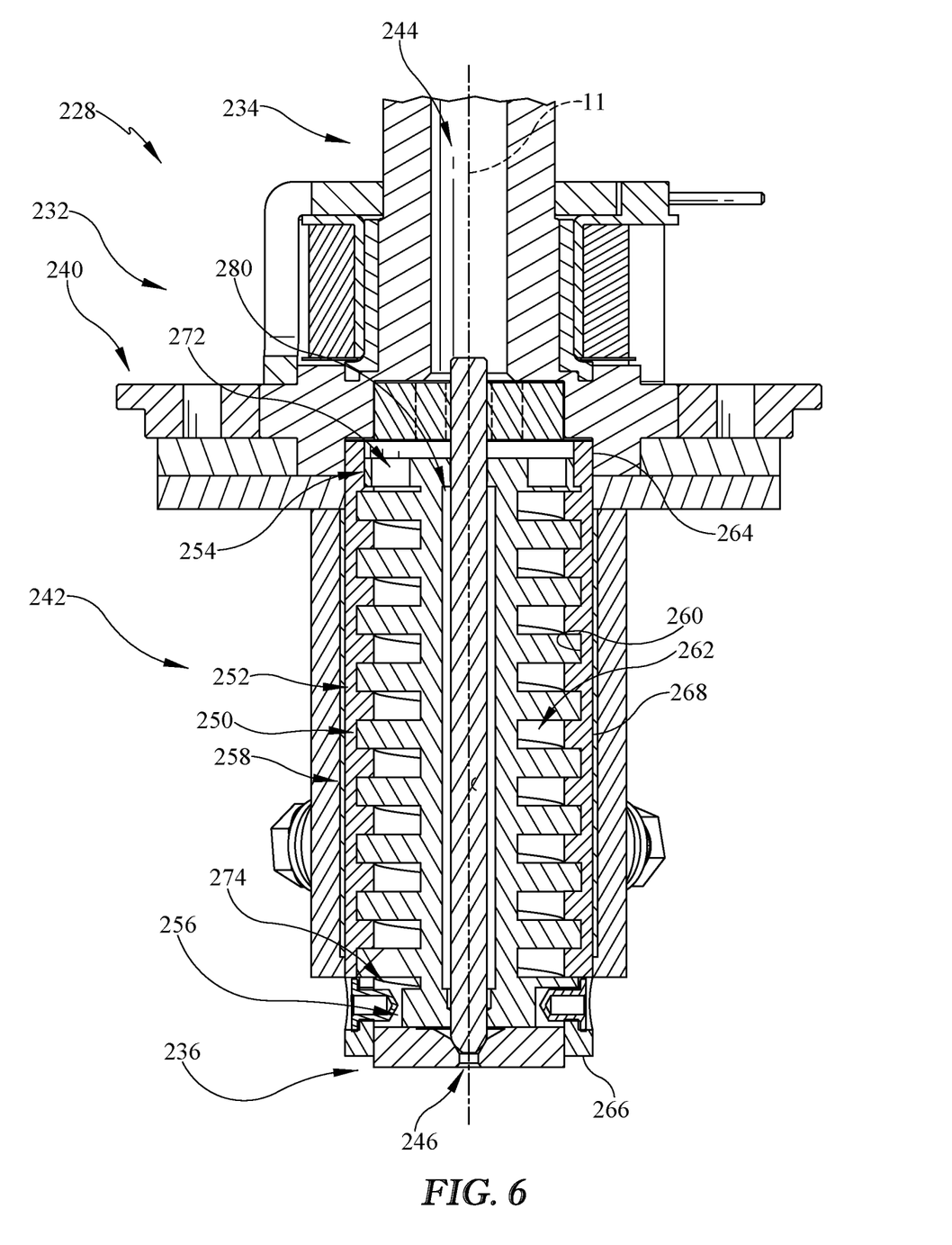
FIG. 6 is cross-sectional view of a second embodiment of a flash-boil doser in accordance with the present disclosure showing that the flash-boil doser includes a doser body having a housing and a heat exchanger assembly, a doser inlet, and a doser outlet, and further showing the heat exchanger assembly includes an outer sleeve, an inner helical insert arranged in the outer sleeve to form a helical passageway, and guide plates that are integrally formed with the inner helical insert to block reducing agent from flowing through an inner channel of the inner helical insert.

Another embodiment of a flash-boil doser 228 in accordance with the present disclosure is shown in FIG. 6. The flash-boil doser 228 is substantially similar to the flash-boil doser 28 shown in FIGS. 1-5 and described herein. Accordingly, similar reference numbers in the 200 series indicate features that are common between the flash-boil doser 28 and the flash-boil doser 228. The description of the flash-boil doser 28 is incorporated by reference to apply to the flash-boil doser 228, except in instances when it conflicts with the specific description and the drawings of the flash-boil doser 28.

The flash-boil doser 228 includes a doser body 232, a doser inlet 234, and a doser outlet 236 as shown in FIG. 6. The doser body 232 includes a housing 240 and a heat exchanger assembly 242 that is arranged in the housing 240. The heat exchanger assembly 242 is configured to heat reducing agent and thereby increase a pressure within the heat exchanger assembly 242 to drive injection of the reducing agent into the exhaust passageway 16.

The heat exchanger assembly 242 includes an outer sleeve 250, an inner helical insert 252, guide plates 254, 256, and at least one heater 258 as shown in FIG. 6. The outer sleeve 250 is shaped to define a spiral channel 260 that wraps around the doser axis 11 and opens toward the doser axis 11. The inner helical insert 252 is arranged in the outer sleeve 250 and shaped to mate with the spiral channel 260 to form a helical passageway 262 between the outer sleeve 250 and the inner helical insert 252. The guide plates 254, 256 are each coupled to a respective end of the outer sleeve 250 to define the heat exchanger inlet 272 and the heat exchanger outlet 274 in fluid communication with the helical passageway 262. The heater 258 is arranged around an outer surface 268 of the outer sleeve 250 and configured to conductively heat the outer sleeve 250 to heat reducing agent in the helical passageway 262.

In the illustrative embodiment, the inner helical insert 252 is integrally formed with the first guide plate 254 and the second guide plate 256 as shown in FIG. 6. The guide plates 254, 256 are integrally formed with the inner helical insert 252 such that the inner helical insert 252, the first guide plate 254, and the second guide plate 256 are a single, integral component. The guide plates 254, 256 are engage the respective ends 264, 266 of the outer sleeve 250 and a portion of the pressure-activated outlet valve 84 to block reducing agent from flowing into an inner passageway 280 of the inner helical insert 252.

The following numbered clauses include embodiments that are contemplated and non-limiting:

Clause 1. A flash-boil doser adapted for use in an exhaust aftertreatment system to inject a reducing agent into an exhaust passageway of the exhaust aftertreatment system, the flash-boil doser comprising a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway, a doser inlet coupled to the doser body that defines an inlet passageway that opens into the heat exchanger assembly to admit the reducing agent from an associated reducing agent tank, and a doser outlet coupled to the doser body that defines an outlet passageway that opens from the heat exchanger assembly into the exhaust passageway, the doser outlet spaced apart axially from the doser inlet relative to a doser axis of the flash-boil doser.

Clause 2. The system of clause 1, any other suitable clause, or any combination of suitable clauses, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

Clause 3. The system of clause 2, any other suitable clause, or any combination of suitable clauses, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway Clause 4. The system of clause 3, any other suitable clause, or any combination of suitable clauses, the first and second guide plates are configured to block the reducing agent from flowing into an inner passageway that extends axially through the inner helical insert.

Clause 5. The system of clause 4, any other suitable clause, or any combination of suitable clauses, wherein the inner helical insert is integrally formed with the first guide plate and the second guide plate such that the inner helical insert, the first guide plate, and the second guide plate are a single, integral component.

Clause 6. The system of clause 2, any other suitable clause, or any combination of suitable clauses, wherein the doser outlet includes a pressure-activated outlet valve that blocks or allows flow through the outlet passageway.

Clause 7. The system of clause 6, any other suitable clause, or any combination of suitable clauses, wherein the pressure-activated outlet valve is configured to move from a normally-closed position to an open position when a predetermined pressure within the helical passageway is reached to discharge heated reducing agent from the helical passageway through the outlet passageway and into the exhaust passageway for mixing with exhaust gases therein during use of the flash-boil doser in the exhaust aftertreatment system.

Clause 8. The system of clause 7, any other suitable clause, or any combination of suitable clauses, wherein the inner helical insert is shaped to include an inner passageway that extends through the inner helical insert and is sized to receive a portion of the pressure-activated outlet valve such that the heat exchanger assembly is arranged around the portion of the pressure-activated outlet valve.

Clause 9. The system of clause 8, any other suitable clause, or any combination of suitable clauses, wherein the pressure-activated outlet valve includes an inlet valve that blocks or allows flow through the inlet passageway, an outlet valve that blocks or allows flow through the outlet passageway, and a connector rod arranged to extend through the inner passageway of the inner helical insert and mechanically interconnecting the inlet valve and the outlet valve.

Clause 10. The system of clause 9, any other suitable clause, or any combination of suitable clauses, wherein the connector rod is configured to cause the inlet valve to move to a closed position in response to motion of the pressure-activated outlet valve to the opened position and to cause the inlet valve to move to an opened position in response to motion of the pressure-activated outlet valve to the closed position.

Clause 11. A reducing agent mixer for use in an exhaust aftertreatment system for an over-the-road vehicle, the reducing agent mixer comprising a mixing can defining at least a portion of an exhaust passageway for receiving a flow of exhaust gases therein, and a flash-boil doser mounted to the mixing can and configured to heat a reducing agent to drive the reducing agent to a predetermined pressure and to inject the reducing agent into the exhaust passageway of the mixing can.

Clause 12. The reducing agent mixer of clause 11, any other suitable clause, or any combination of suitable clauses, wherein the flash-boil doser comprises a doser body including a housing and a heat exchanger assembly.

Clause 13. The reducing agent mixer of clause 12, any other suitable clause, or any combination of suitable clauses, wherein the heat exchanger assembly is arranged in the housing and configured to heat the reducing agent thereby increasing a pressure within the heat exchanger assembly to drive injection of the reducing agent into the exhaust passageway.

Clause 13. The reducing agent mixer of clause 12, any other suitable clause, or any combination of suitable clauses, wherein the flash-boil doser further comprises a doser inlet coupled to the doser body that defines an inlet passageway that opens into the heat exchanger assembly to admit the reducing agent from an associated reducing agent tank.

Clause 14. The reducing agent mixer of clause 13, any other suitable clause, or any combination of suitable clauses, wherein the flash-boil doser further comprises a doser outlet coupled to the doser body that defines an outlet passageway that opens from the heat exchanger assembly into the exhaust passageway.

Clause 15. The reducing agent mixer of clause 14, any other suitable clause, or any combination of suitable clauses, wherein the doser outlet is spaced apart axially from the doser inlet relative to a doser axis of the flash-boil doser.

Clause 16. The reducing agent mixer of clause 15, any other suitable clause, or any combination of suitable clauses, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

Clause 17. The reducing agent mixer of clause 16, any other suitable clause, or any combination of suitable clauses, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway.

Clause 18. The reducing agent mixer of clause 17, any other suitable clause, or any combination of suitable clauses, wherein the first and second guide plates are configured to block the reducing agent from flowing into an inner passageway that extends axially through the inner helical insert.

Clause 19. The reducing agent mixer of clause 18, any other suitable clause, or any combination of suitable clauses, wherein the inner helical insert is integrally formed with the first guide plate and the second guide plate such that the inner helical insert, the first guide plate, and the second guide plate are a single, integral component.

Clause 20. The reducing agent mixer of clause 16, any other suitable clause, or any combination of suitable clauses, wherein the doser outlet includes a pressure-activated outlet valve that blocks or allows flow through the outlet passageway.

Clause 21. The reducing agent mixer of clause 20, any other suitable clause, or any combination of suitable clauses, wherein the pressure-activated outlet valve is configured to move from a normally-closed position to an open position when the predetermined pressure within the helical passageway is reached to discharge heated reducing agent from the helical passageway through the outlet passageway and into the exhaust passageway for mixing with exhaust gases therein during use of the flash-boil doser in the exhaust aftertreatment system.

Clause 22. The reducing agent mixer of clause 21, any other suitable clause, or any combination of suitable clauses, wherein the inner helical insert is shaped to include an inner passageway that extends through the inner helical insert and is sized to receive a portion of the pressure-activated outlet valve such that the heat exchanger assembly is arranged around the portion of the pressure-activated outlet valve.

Clause 23. The reducing agent mixer of clause 22, any other suitable clause, or any combination of suitable clauses, wherein the pressure-activated outlet valve includes an inlet valve that blocks or allows flow through the inlet passageway, an outlet valve that blocks or allows flow through the outlet passageway, and a connector rod arranged to extend through the inner passageway of the inner helical insert and mechanically interconnecting the inlet valve and the outlet valve.

Clause 24. The reducing agent mixer of clause 23, any other suitable clause, or any combination of suitable clauses, wherein the connector rod is configured to cause the inlet valve to move to a closed position in response to motion of the pressure-activated outlet valve to the opened position and to cause the inlet valve to move to an opened position in response to motion of the pressure-activated outlet valve to the closed position.

Clause 25. An over-the-road vehicle, the vehicle comprising an internal combustion engine configured to produce a flow of exhaust gases that are conducted through an exhaust passageway defined by an exhaust conduit, and an exhaust aftertreatment system configured to treat the flow of exhaust gases, the system including a reducing agent tank configured to store a reducing agent therein, a mixing can defining at least a portion of the exhaust passageway for receiving the flow of exhaust gases therein, and a flash-boil doser mounted to the mixing can and configured to inject the reducing agent into the mixing can.

Clause 26. The reducing agent mixer of clause 25, any other suitable clause, or any combination of suitable clauses, wherein the flash-boil doser comprises a doser body including a housing and a heat exchanger assembly.

Clause 27. The reducing agent mixer of clause 14, any other suitable clause, or any combination of suitable clauses, wherein the heat exchanger assembly is arranged in the housing and configured to heat the reducing agent thereby increasing a pressure within the heat exchanger assembly to drive injection of the reducing agent into the exhaust passageway.

Clause 28. The reducing agent mixer of clause 27, any other suitable clause, or any combination of suitable clauses, wherein the flash-boil doser further comprises a doser inlet coupled to the doser body that defines an inlet passageway that opens into the heat exchanger assembly to admit the reducing agent from an associated reducing agent tank.

Clause 29. The reducing agent mixer of clause 28, any other suitable clause, or any combination of suitable clauses, wherein the flash-boil doser further comprises a doser outlet coupled to the doser body that defines an outlet passageway that opens from the heat exchanger assembly into the exhaust passageway.

Clause 30. The reducing agent mixer of clause 29, any other suitable clause, or any combination of suitable clauses, wherein the doser outlet is spaced apart axially from the doser inlet relative to a doser axis of the flash-boil doser.

Clause 31. The reducing agent mixer of clause 30, any other suitable clause, or any combination of suitable clauses, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

Clause 32. The reducing agent mixer of clause 31, any other suitable clause, or any combination of suitable clauses, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway.

Clause 33. The reducing agent mixer of clause 32, any other suitable clause, or any combination of suitable clauses, wherein the first and second guide plates are configured to block the reducing agent from flowing into an inner passageway that extends axially through the inner helical insert.

Clause 34. The reducing agent mixer of clause 33, any other suitable clause, or any combination of suitable clauses, wherein the inner helical insert is integrally formed with the first guide plate and the second guide plate such that the inner helical insert, the first guide plate, and the second guide plate are a single, integral component.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A flash-boil doser adapted for use in an exhaust aftertreatment system to inject a reducing agent into an exhaust passageway of the exhaust aftertreatment system, the flash-boil doser comprising a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway, a doser inlet coupled to the doser body that defines an inlet passageway that opens into the heat exchanger assembly to admit the reducing agent from an associated reducing agent tank, and a doser outlet coupled to the doser body that defines an outlet passageway that opens from the heat exchanger assembly into the exhaust passageway, the doser outlet spaced apart axially from the doser inlet relative to a doser axis of the flash-boil doser, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

2. The doser of claim 1, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway, the first and second guide plates are configured to block the reducing agent from flowing into an inner passageway that extends axially through the inner helical insert.

3. The doser of claim 2, wherein the inner helical insert is integrally formed with the first guide plate and the second guide plate such that the inner helical insert, the first guide plate, and the second guide plate are a single, integral component.

4. The doser of claim 1, wherein the doser outlet includes a pressure-activated outlet valve that blocks or allows flow through the outlet passageway, the pressure-activated outlet valve configured to move from a normally-closed position to an open position when a predetermined pressure within the helical passageway is reached to discharge heated reducing agent from the helical passageway through the outlet passageway and into the exhaust passageway for mixing with exhaust gases therein during use of the flash-boil doser in the exhaust aftertreatment system.

5. The doser of claim 4, wherein the inner helical insert is shaped to include an inner passageway that extends through the inner helical insert and is sized to receive a portion of the pressure-activated outlet valve such that the heat exchanger assembly is arranged around the portion of the pressure-activated outlet valve.

6. The doser of claim 5, wherein the pressure-activated outlet valve includes an inlet valve that blocks or allows flow through the inlet passageway, an outlet valve that blocks or allows flow through the outlet passageway, and a connector rod arranged to extend through the inner passageway of the inner helical insert and mechanically interconnecting the inlet valve and the outlet valve, the connector rod configured to cause the inlet valve to move to a closed position in response to motion of the pressure-activated outlet valve to the opened position and to cause the inlet valve to move to an opened position in response to motion of the pressure-activated outlet valve to the closed position.

7. A reducing agent mixer for use in an exhaust aftertreatment system for an over-the-road vehicle, the reducing agent mixer comprising a mixing can defining at least a portion of an exhaust passageway for receiving a flow of exhaust gases therein, and a flash-boil doser mounted to the mixing can and configured to heat a reducing agent to drive the reducing agent to a predetermined pressure and to inject the reducing agent into the exhaust passageway of the mixing can, the flash-boil doser comprising a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway, a doser inlet coupled to the doser body that defines an inlet passageway that opens into the heat exchanger assembly to admit the reducing agent from an associated reducing agent tank, and a doser outlet coupled to the doser body that defines an outlet passageway that opens from the heat exchanger assembly into the exhaust passageway, the doser outlet spaced apart axially from the doser inlet relative to a doser axis of the flash-boil doser, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

8. The reducing agent mixer of claim 7, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway, the first and second guide plates are configured to block the reducing agent from flowing into an inner passageway that extends axially through the inner helical insert.

9. The reducing agent mixer of claim 8, wherein the inner helical insert is integrally formed with the first guide plate and the second guide plate such that the inner helical insert, the first guide plate, and the second guide plate are a single, integral component.

10. The reducing agent mixer of claim 7, wherein the doser outlet includes a pressure-activated outlet valve that blocks or allows flow through the outlet passageway, the pressure-activated outlet valve configured to move from a normally-closed position to an open position when the predetermined pressure within the helical passageway is reached to discharge heated reducing agent from the helical passageway through the outlet passageway and into the exhaust passageway for mixing with exhaust gases therein during use of the flash-boil doser in the exhaust aftertreatment system.

11. The reducing agent mixer of claim 10, wherein the inner helical insert is shaped to include an inner passageway that extends through the inner helical insert and is sized to receive a portion of the pressure-activated outlet valve such that the heat exchanger assembly is arranged around the portion of the pressure-activated outlet valve.

12. The reducing agent mixer of claim 11, wherein the pressure-activated outlet valve includes an inlet valve that blocks or allows flow through the inlet passageway, an outlet valve that blocks or allows flow through the outlet passageway, and a connector rod arranged to extend through the inner passageway of the inner helical insert and mechanically interconnecting the inlet valve and the outlet valve, the connector rod configured to cause the inlet valve to move to a closed position in response to motion of the pressure-activated outlet valve to the opened position and to cause the inlet valve to move to an opened position in response to motion of the pressure-activated outlet valve to the closed position.

13. An over-the-road vehicle, the vehicle comprising
an internal combustion engine configured to produce a flow of exhaust gases that are conducted through an exhaust passageway defined by an exhaust conduit, and
an exhaust aftertreatment system configured to treat the flow of exhaust gases, the exhaust aftertreatment system including a reducing agent tank configured to store a reducing agent therein, a mixing can defining at least a portion of the exhaust passageway for receiving the flow of exhaust gases therein, and a flash-boil doser mounted to the mixing can and configured to inject the reducing agent into the mixing can, the flash-boil doser comprising a doser body including a housing and a heat exchanger assembly, the heat exchanger assembly arranged in the housing and configured to heat the reducing agent thereby increasing a pressure within the heat exchanger assembly to drive injection of the reducing agent into the exhaust passageway, a doser inlet coupled to the doser body that defines an inlet passageway that opens into the heat exchanger assembly to admit the reducing agent from an associated reducing agent tank, and a doser outlet coupled to the doser body that defines an outlet passageway that opens from the heat exchanger assembly into the exhaust passageway, the doser outlet spaced apart axially from the doser inlet relative to a doser axis of the flash-boil doser, wherein the heat exchanger assembly includes (i) an outer sleeve shaped to define a spiral channel that wraps around the doser axis and opens toward the doser axis, (ii) an inner helical insert arranged in the outer sleeve and shaped to mate with the spiral channel to form a helical passageway between the outer sleeve and the inner helical insert that is in fluid communication with the inlet and outlet passageways, and (iii) at least one heater arranged around an outer surface of the outer sleeve and configured to conductively heat the outer sleeve to heat the reducing agent in the helical passageway.

14. The vehicle of claim 13, wherein the heat exchanger assembly further includes a first guide plate coupled to a first end of the outer sleeve to form a heat exchanger inlet that opens into the helical passageway and a second guide plate coupled to a second end of the outer sleeve to form a heat exchanger outlet that opens into the outlet passageway, the first and second guide plates are configured to block the reducing agent from flowing into an inner passageway that extends axially through the inner helical insert.

15. The vehicle of claim 14, wherein the inner helical insert is integrally formed with the first guide plate and the second guide plate such that the inner helical insert, the first guide plate, and the second guide plate are a single, integral component.

* * * * *